Dec. 29, 1959 S. LACROIX 2,919,159
PNEUMATIC CONVEYING METHOD AND SYSTEM
Filed June 7, 1957 3 Sheets-Sheet 1
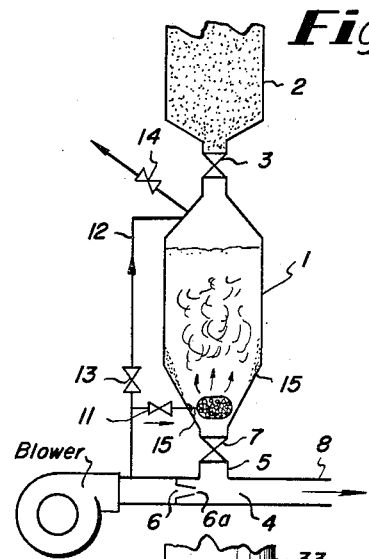
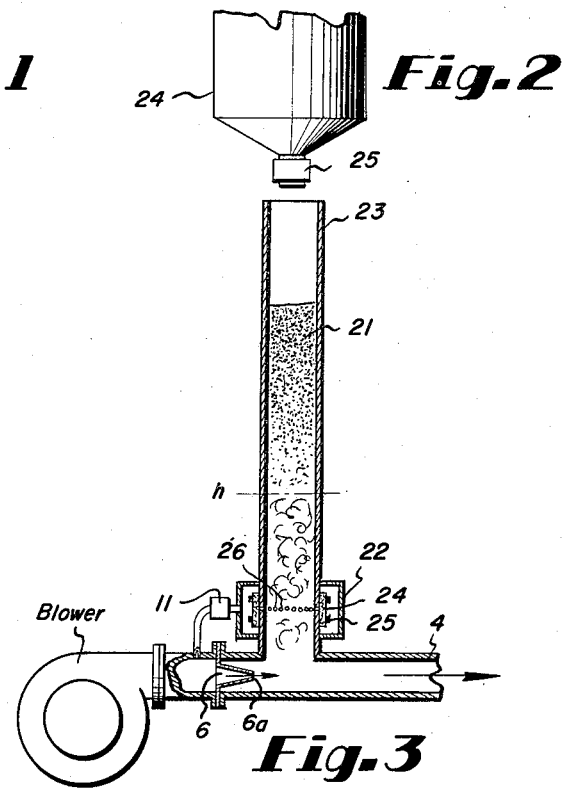
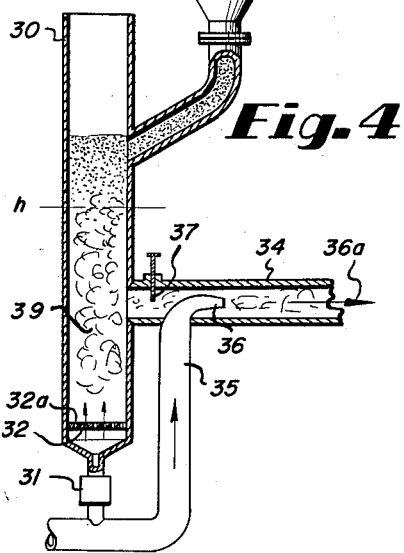
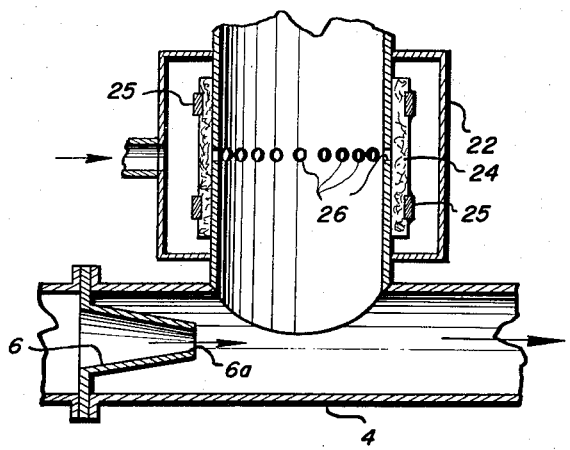
INVENTOR
SERAPHIN LACROIX
BY Taulmin & Taulmin
ATTORNEYS

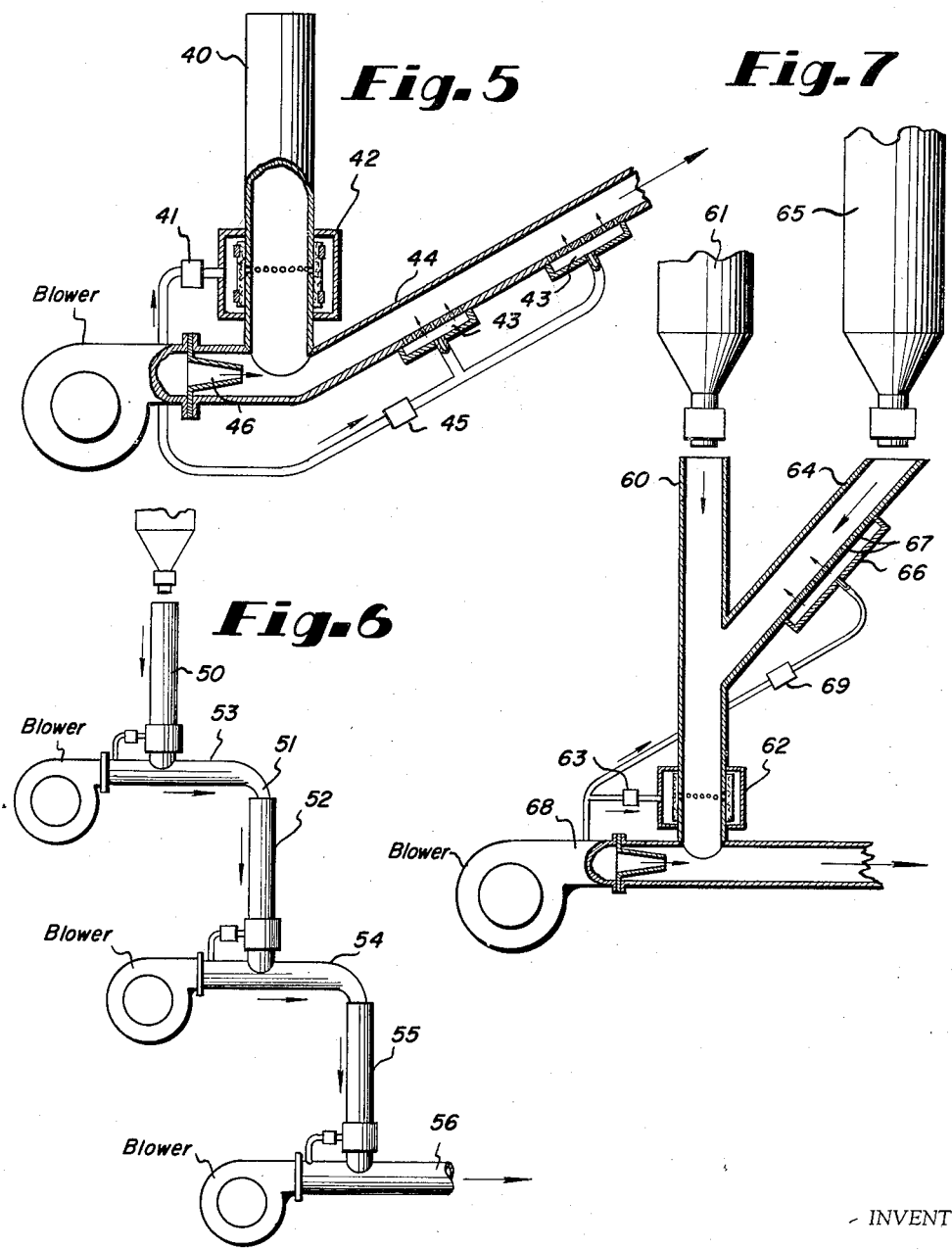

2,919,159
Patented Dec. 29, 1959

2,919,159

PNEUMATIC CONVEYING METHOD AND SYSTEM

Seraphin Lacroix, Salindres, France, assignor to Pechiney, Compagnie de Produits Chimiques et Electrometallurgiques, Paris, France, a corporation of France Application June 7, 1957, Serial No. 664,227

Claims priority, application France June 8, 1956

4 Claims. (Cl. 302—53)

This invention relates to an improved method and system for the pneumatic conveyance of materials, which system comprises the fluidization of the materials to be conveyed and is particularly suited for the conveyance of powders.

The method known in the art as "fluidization" is often applied industrially for converting powders into a "fluid" state in order to facilitate transporting them in pneumatic conveying devices.

This process is, for instance, described in "Fluidization" by D. F. Othmer, published by Reinhold, see in particular pages 117 to 138 and pages 157 to 183, 1956, and in "Unit Operations of Chemical Engineering," by McCabe and Smith, McGraw Hill, 1956, pages 262 to 279.

In the known devices of this kind, the powdery material is fluidized in a closed vessel and then fed into a conveying pipe which is attached in a hermetically sealed manner to the aforesaid vessel. This requires that a given pressure be constantly maintained within the storage and fluidization bin, and that the flow of air and that of powder are controlled and currently adjusted by means of several valves. A satisfactory continuous flow of the fluidized material under stable conditions can, therefore, only be maintained by a complicated system of automatic controls.

Breakdown of this control system by failure of one of the valves to respond to the controls occurs frequently.

It is an object of my invention to provide for a pneumatic device for the fluidization and transportation of materials, in particular powdery materials, which device is of simpler construction than those known in the art and yet permits to ensure a more perfect continuous conveyance of the aforesaid materials without the requirement of automatic control devices.

This object is achieved and the drawbacks of the known devices are avoided by the improved pneumatic conveying system of my invention in which the process of fluidization is applied to a powder column which is permanently fluidized at least in its bottom region, while the top of the column freely communicates with the surrounding atmosphere. Fluidized material from the column is constantly fed into a pneumatic conveying pipe and led off, for instance, by means of air or another transporting medium blown through an ejector into the conveying line, and concurrently therewith new powdery material is constantly fed into the open column to be fluidized therein.

This method and system of fluidizing and conveying pulverulent materials continuously, with the fluidizing step being carried out in free communication with the air surrounding the system, eliminates firstly the necessity of providing a pressure vessel and secondly the control valves for regulating pressure therein and of powder flow therethrough.

In a preferred system of my invention powder which is permanently fluidized in an open column or fluidization tower, is fed, through passage means provided preferably at the bottom of the column, into a conventional pneumatic conveying pipe.

It is an important feature of my invention that the aforesaid passage means permit free communication between the column and the conveying pipe. If the conveying pipe is connected to the column at a point other than the bottom of the latter, the static pressure in the ejector must be equilibrated.

As fluidized powdery material is withdrawn, e.g. at the foot of the column, new material may be fed into the column from above or from a laterally disposed feeding line, and may be fluidized currently in the column.

This new material may be derived from a conventional bin or hopper, and the outflow therefrom may be controlled, at will and independently from the rate at which fluidized material is removed from the bottom of the fluidization tower, by conventional valve means.

This independent control is only possible in the system according to my invention, and represents an important and advantageous feature thereof.

The height of the column of fluidized powder to be maintained in the system of my invention depends upon several factors, among which there are the static air pressure in the pneumatic conveying pipe, and the physical properties of the powdery material, such as its specific weight, its bulk density, the size and form of the powder grains or particles, and the degree of humidity of the material as released from the bin.

In fact, the column plays a part in the system of my invention, which is somewhat analogous to that of a barometric leg of a liquid in a vacuum distillation system, the excess pressure of the entraining conveying agent being balanced by the weight of pulverulent material in the column.

Due to the aforesaid feature of free communication between the fluidization column and the internal space of the pneumatic conveying line for transporting off the fluidized material, the flow of the conveyed product depends also on the cross section of the column, and, in particular, on the rate of flow of the vehicle in which the fluidized material is entrained.

The proportion of air pressure to the width of the column and the temperature prevailing in the system which influences the gas volume determine the rate of flow of the material. If the second and third of these factors are constant, an adjustment of the excess pressure and therewith the rate of flow of fluidizing air permits to vary the flow of powder from the tower into the conveying pipe.

The fluidization step in the column can be expressed in the form of an equation given by G. G. Brown et al. in "Unit Operations," published by John Wiley & Sons, Inc. (1950), pages 270 to 274, which reads $$\Delta P_f = L(1-X)(\rho_s - \rho)\left(\frac{g}{g_c}\right)$$

in this equation $\Delta P_f$ = pressure drop required for fluidizing
$L = h$ = height of the material to be fluidized in the fluidization tower
$X$ = porosity of the column portion of material to be fluidized in the tower
$\rho_s$ = density of the solid particles
$\rho$ = density of the fluid
$g$ = acceleration due to gravity
$g_c$ = conversion factor from force to mass.

The porosity $X$ is equal to $$\frac{\text{volume of void space}}{\text{total volume of material to be fluidized}}; X = \frac{V_{void}}{V_{total}}$$

and can be easily computed if the density of the solid material, its bulk density, the height $h$ and the cross sectional area $A$ of the column are known.

Taking into account that $V_{\text{void}} - V_{\text{total}} = V_{\text{solid}}$, and B is the bulk density of the solid material and consequently the mass of material occupying the total volume to be fluidized is $$M_{\text{solid}} = B \cdot V_{\text{total}} = B \cdot A \cdot h$$

$$V_{\text{solid}} = \frac{M_{\text{solid}}}{\rho_{\text{solid}}} = \frac{B \cdot A \cdot h}{\rho_{\text{solid}}}$$

and $$V_{\text{void}} = A \cdot h \left(1 - \frac{B}{\rho_{\text{solid}}}\right)$$

the above equation for $\Delta P_f$ reads $$\Delta P_f = Bh \left(1 - \frac{\rho}{\rho_s}\right)\left(\frac{g}{g_c}\right)$$

The equations dominating the transport of the material from the fluidized column through the pneumatic pipe are very complicated and the necessary values of excess pressure etc. are best determined empirically. Generally speaking I find that the total excess pressure $\Delta P_{\text{tot}}$ must be at least equal to the sum of the share of excess pressure $\Delta P_f$ required for fluidization plus the share of $\Delta P_{\text{conv}}$ required for pneumatically conveying the fluidized material through the pneumatic pipe:

$$\Delta P_{\text{tot}} = \Delta P_f + \Delta P_{\text{conv}}$$

Materials that can be advantageously conveyed in the system of my invention are, for instance, flour, silica, alumina, concrete dust, pulverized oxidic or sulfidic ores, dry sludge, etc.

As a vehicle for these materials, there is preferably used a carrier gas such as air, or nitrogen, carbon dioxide etc., which carrier gas is inactive with regard to the conveyed material.

According to another feature of the invention means such as a diaphragm are provided at the bottom of the column for regulating the cross sectional area of the latter at its bottom exit. These means may serve to assist in the control of the flow rate of the fluidized material by the flow rate of carrier air.

The means for feeding fresh material into the open column are conventional and may be disposed to feed the fresh material into the column from the top or laterally at a desired level of the column. Feeding through the top opening of the column is preferred as it permits the simplest arrangement of the storage bin or hopper relative to the column.

The system according to my invention comprises a tubular tower which is preferably disposed vertically and is filled to a desired level with the powdery material to be fluidized. The tower communicates freely with a pneumatic conveying pipe which is preferably disposed at right angle, or somewhat inclined relative to the tower.

The tubular tower is provided with means for fluidizing at least a zone of the powder contained in the tower, which means may be disposed preferably at the bottom of the tower where the latter communicates freely with the conveying pipe; however, in some instances, it may be useful to arrange these fluidizing means at a higher level of the tower, either alone or in combination with fluidizing means at the bottom of the column.

If the pneumatic pipe is inclined at an angle other than 90° relative to the fluidization column or tower, it may be advisable to provide auxiliary fluidization means such as orifices, porous elements etc. for passing auxiliary fluidizing medium therethrough, at different levels in the inclined portion of the pneumatic conveying pipe subsequent to the entrance of material therein to coming from the fluidization column or tower. Thereby, it is possible to avoid the formation of deposits of powder on the lower internal inclined walls of the pneumatic pipe.

The invention may be carried out with a single tubular tower or with several towers in parallel or in series arrangement. In the latter case, several sections of the tower, situated above each other, may be connected to each other by means of horizontal or inclined ducts; they may also be connected by means of intermediate chambers which are eventually provided with conventional means for mixing several materials and capable of transmitting pressure from one section to another. Such arrangements are advisable, for instance, when, owing to particular local conditions in a plant, it is not possible to use a single tower of sufficient height.

An arrangement of this kind is also used with advantage when pulverulent materials, derived simultaneously from several sources, are directed towards the same pneumatic conveying pipe, so that the system of my invention may serve for mixing two or more of these materials. Tubular fluidization towers, containing different powders to be mixed, may, for instance, be disposed parallel to each other and lead into a common mixing container, from which another single tower or column according to the invention leads to the pneumatic conveying pipe.

Generally speaking, when a pulverulent material stored within a storage tank or bin is to be transferred to the place of its use or a larger transport means, such as a railroad car, a truck or the like, the material is removed from the tank or bin by mechanical, pneumatic or manual means—eventually with the aid of fluidization—and is introduced into a column or tower of the system according to the invention; at the bottom of this tower air is blown in jets which are sufficiently divided so as to permanently maintain a column of fluidized powder within the tower.

In order to further illustrate the invention, the accompanying drawings show a conventional device, as well as, by way of example only, the system according to the invention. In these drawings—

Figure 1 is a schematic view of a conventional device for pneumatically conveying fluidized powder;

Figure 2 shows schematically an embodiment of the system according to the invention;

Figure 3 is a cross sectional view showing details of the bottom region of the column in the system illustrated in Figure 2;

Figure 4 shows another embodiment of the system according to the invention;

Figure 5 shows the same embodiment as Figure 2 but with auxiliary fluidizing means;

Figure 6 shows an arrangement of a plurality of systems according to the invention connected in series;

Figure 7 shows an arrangement according to the invention which comprises two fluidizing systems adapted to be used as a mixing system;

Figure 8:
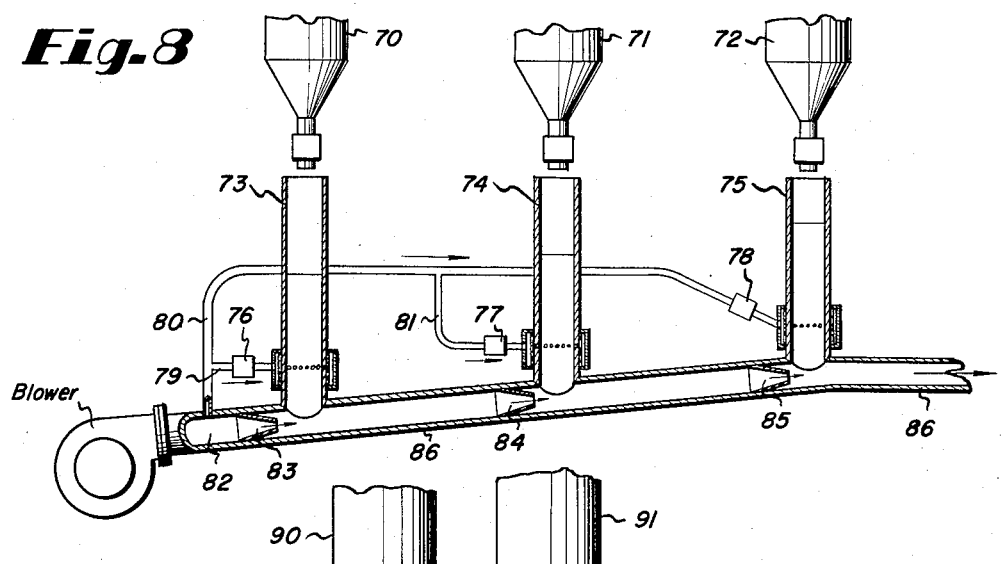
Figure 8 shows three systems according to the invention connected in parallel to form a mixing arrangement.

Referring now to the drawings more in detail, the system known in the art, which is illustrated in Figure 1, comprises a fluidization vessel or hopper 1 which receives pulverulent material from a storage tank or bin 2 through a valve 3, which controls the flow rate at which the material is fed into the hopper 1. The latter is hermetically sealed against the outside. At its conically shaped bottom end, hopper 1 is connected through an outlet 5 with a pneumatic conveying pipe 4. The flow of fluidized powder from the hopper 1 into the pneumatic pipe 4 through this outlet is controlled by means of a valve 7. An air ejector 6 provided with a nozzle 6a is located in pipe 4 adjacent outlet 5 and serves for blowing an air jet past that outlet, thereby entraining fluidized pulverulent material from the hopper 1 in the air stream passing through the conveying branch 8 of pipe 4. The air jet is generated by a conventional blower.

In the bottom region of hopper 1, somewhat above the outlet valve 7, there is disposed a jacket 9 having a plurality of orifices 10, through which air is blown into the interior of the sealed hopper 1 at a rate controllable by valve 11, so as to fluidize the pulverulent material in the hopper.

In view of the fact that hopper 1 is sealed, equilibrium of pressure must be maintained therein by a bypass conduit 12 and valve 13 therein. Safety valve 14 permits excessive air to escape from the hopper 1.

The conventional device of Figure 1 operates of necessity discontinuously, for the closed hopper 1 must be recharged with fresh powder from time to time; obviously, all of the valves shown in Figure 1 are indispensable. If it is desired, to render the working of the device automatic, remote control means must be used for actuating the valves in the air and powder circuits, whose functioning is not easily maintained well coordinated. Furthermore, the conical shape of the bottom portion of hopper 1 causes the formation of air pockets and depositing of unfluidized materials therein as indicated at 15. Hopper 1 is usually arranged intermediate a storage tank or bin and a pneumatic pipe, or it is fed from another source of pulverulent material; eventually it is also possible to use the storage tank itself as a fluidization hopper; however, this has the drawback that the entire tank must be kept constantly under pressure.

The embodiment of the system according to the invention, shown in Figure 2 differs from the known system shown in Figure 1 in that the sealed hopper 1 is replaced by a single tubular column or tower 21 which is open at its top end. At the bottom of tower 11, injector means 22 are provided for injecting a fluidizing agent such as air into the column. Of all the valves of the conventional fluidizing device, only one, to wit valve 11, is retained as directly operative in the fluidizing and conveying system, which now controls the rate of flow of fluidizing air into the interior of the fluidizing column 21. Column 21 is connected directly, without any intermediate valve, to the pneumatic conveying pipe 4, i.e. it communicates freely therewith. The latter is provided in the conventional manner with the ejector 6 also shown in Figure 1. Column or tower 21 is fed with powder by way of its top opening 23, as shown by an arrow, for instance from a conventional storage bin 24 through an outlet valve 25.

Details according to the invention of the fluidizing system which is provided at the bottom of column 21 are shown in Figure 3.

The injector means 22 encloses screening means such as asbestos sheets 24, which are held by means of clamps 25 to cover on the outside a plurality of orifices 26 provided annularly in the wall of column or tower 21.

The embodiment of the system according to the invention illustrated in Figure 4 comprises a fluidizing tower 30 which is filled from a storage bin (not shown) through a laterally attached filling conduit 33. In this embodiment, the fluidizing element 32 is attached to the bottom end of tower 30 and comprises a plurality of openings 32a, for instance in the form of a sieve through which fluidizing agent is blown which is received from the main agent conduit 35 through a branch line via control conduit 31. The fluidized material is withdrawn from tower 30 at a level above the bottom of the latter through pneumatic pipe 34. Main air conduit 35 ends in an ejector 36 whose nozzle opens into the pipe 34 adjacent the end of the latter connected to tower 30. Tower 30 and pneumatic pipe 34 are in free communication with each other while the system is in operation, the ejector being directed away from the tower 30 thereby entraining fluidized material from the latter into the pneumatic pipe and transporting the same away as indicated by arrow 36a. The cross sectional area through which tower 30 communicates freely with pipe 34, can be varied by adjusting the position of means 37 which may be a slide valve, diaphragm or the like.

When operating this system as illustrated in Figure 4 by the method according to the invention, care must be taken that air of sufficient excess pressure passes through valve 31 to fluidize the material column in tower 30 to a determined level $h$ which must be above the level at which tower 30 communicates with pipe 34. Otherwise, unfluidized material from the upper zones of tower 30 may be entrained into pipe 34 and clog the same.

The necessary pressure $\Delta P_f$ can be easily determined from a given $h$, B, $\rho$ and $\rho_s$ in the second above-mentioned equation for $\Delta P_f$.

In the embodiment shown in Figure 5, tower 40 receives fluidizing agent through control valve 41 and fluidizing means 42, while fluidized material is drawn from the bottom of tower 40 into the pneumatic pipe 44 with the aid of ejector 46. In order to prevent undesirable deposits of the transported material in the upwardly rising pipe 44, auxiliary fluidizing means 43 are provided at one or several places at the lower side wall of pipe 44. Fluidizing agent is fed to these fluidizing means from the main pipe leading to the ejector 46 through a branch line and control pipe 45. The fluidizing agent passes through perforations in the fluidizing means 43 into the interior of pipe 44 and maintains the material being transported therethrough completely fluidized.

In the arrangement illustrated in Figure 6, tower 50 pertains to a fluidizing and transporting system similar to that illustrated in Figure 2 and opens at 51 into a second tower 52. The connecting pneumatic pipe 53 leading from tower 50 to tower 52 extends horizontally.

From tower 52 another pneumatic pipe 54 leads at a downwardly inclined angle to a third tower 55. The fluidized material is finally removed from the bottom of this tower 55 through the main pneumatic pipe line 56.

Figure 9:
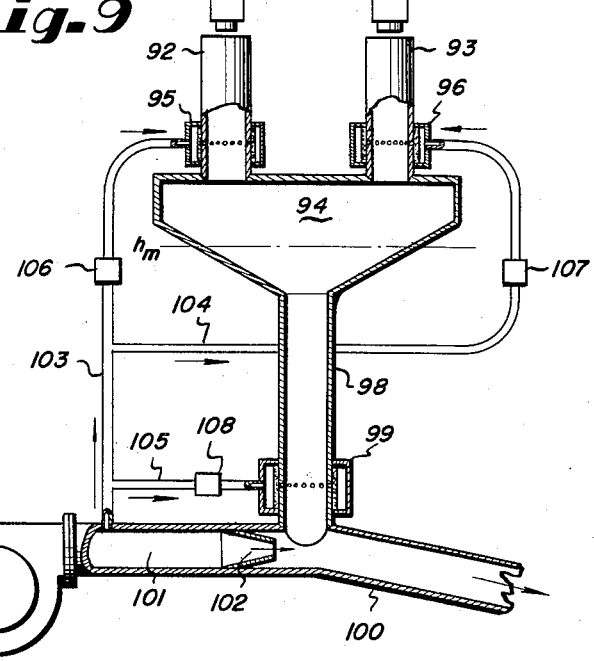
Figure 9 shows a fluidizing, mixing and transporting system according to the invention comprising an intermediary mixing chamber.

Figures 7 to 9 illustrates different arrangements in which several materials can be mixed together with the aid of the fluidizing and transporting method and system according to the invention.

In Figure 7 main tower 60 receives a first material from a storage bin 61. At its bottom end this tower 60 is provided with a fluidizing arrangement comprising fluidizing means 62 and control valve 63 similar to the system illustrated in Figure 2. At a determined level above the fluidizing means 63, tower 60 is provided with an obliquely arranged branch tower 64 which is fed through its open upper end with a second material from storage tank 65. At the lower half of the enclosing tubular wall of this branch tower 64 there is mounted a fluidizing member 66 which comprises a plurality of apertures 67. Fluidizing agent from the main blower line 68 reaches fluidizing means 62 through a branch line to the aforesaid valve 63, and fluidizing member 66 receives fluidizing agent through a branch line and control valve 69. The mixture of the first material and the second previously fluidized material is fluidized in the bottom portion of tower 60 and drawn off from this tower by ejector and pneumatic pipe means similar to those illustrated in Figure 2.

In the mixing arrangement illustrated schematically in Figure 8, three different materials stored in storage vessels 70, 71, and 72 are released, each into a fluidizing tower 73, 74 and 75 respectively, each of which is provided at its lower end zone with fluidizing valve and passage means 76, 77 and 78 similar to those illustrated in Figure 3. Fluidizing agent is introduced into these fluidizing means through branch lines 79, 80 and 81, which are connected to the main ejector line 82 leading from a conventional blower to a first ejector 83 associated with tower 73. Ejector 84 which is associated with tower 74 and ejector 85 which is associated with tower 75 are subsequently arranged in the common pneumatic conveying line 86 which leads from the bottom of tower 73 to the bottom of tower 74 and further to the bottom of tower 75 and from there to the point of destination of the material. Towers 73, 74, and 75 are thus connected in parallel to the same pneumatic conveying line 86.

Yet another mixing arrangement comprising systems and operated according to the method of my invention is illustrated in Figure 9. In this arrangement two pulverulent materials stored in bins 90 and 91 respectively, are released into fluidizing towers 92 and 93 respectively which open at their bottom ends into a common intermediary mixing chamber 94. Shortly above their bottom openings, towers 92 and 93 are provided with fluidizing members 95 and 96 similar to those illustrated in Figure 3. The preferably conically shaped bottom of chamber 94 leads directly into a lower tower 98 which is provided near its bottom end with fluidizing member 99.

At its bottom end, tower 98 opens through a passage providing free communication into the pneumatic conveying pipe 100. Transporting medium is blown from a conventional blower through main blower pipe 101 and ejector 102 into pipe 100 past the bottom opening of tower 98. From the blower line 101, branch lines 103, 104 and 105 lead to control valves 106, 107 and 108 respectively, which are associated with fluidizing members 95, 96 and 99, respectively.

While material from bin 90 is fluidized at least in the lower portion of tower 92 and material from bin 91 is fluidized at least in the lower portion of tower 93, both enter chamber 94 in a completely fluidized state and are thus easily mixed therein under the influence of the fluidizing effect prevailing throughout the entire tower 98 preferably to the mixing level $h_m$.

The functioning of the system according to my invention shall be further illustrated by way of examples, which are, however, not to be considered as limiting the fields in which the system and method of my invention can be applied.

Example I

A quantity of cement powder having a specific gravity of about 3.2 grams/cm.$^3$, and the bulk density of which varies between 1.6 and 1.85 g./cm.$^3$, is to be transported from one storage bin into another storage tank through a 70 m. long conduit, and is to be elevated simultaneously to a height of about 20 meters. The transporting conduit is a steel pipe having an internal diameter of 65 millimeters; it comprises seven bends at 90°, each with a radius of curvature of 1 meter. A single conventional ejector (6) of the type shown in the drawings, is employed, which comprises a nozzle (6a) of 24 millimeters diameter protruding into the pneumatic conduit (4 in Figure 2). The tubular tower 21 has an internal diameter of 100 millimeters and is 4 meters high; at the base of tower 21, the power is fluidized with compressed air by means of the device illustrated in detail in Figure 3. Air, compressed at an excess pressure of 500 to 600 grams/cm.$^2$ above the pressure of the surrounding atmosphere is used as fluidizing and transporting agent and is blown through the ejector into the pneumatic conduit, transporting two metric tons of pulverulent material per hour at an air consumption of 450 cubic meters per hour (reduced to 0° C. and 760 mm. Hg).

Example II

A quantity of cement powder having the same properties as in Example I is fluidized and transported in the same manner. However, the fluidizing and transporting air is initially compressed to an excess pressure of 800 to 900 g./cm.$^2$ above the pressure of the surrounding atmosphere. Thereby, the transported hourly amount of cement powder is increased to 4 to 5 tons, the rate of air consumption being the same as in Example I.

Example III

A dry alumina hydrate is to be transported over a length of 76 meters and raised at the same time by 13 meters to a storage bin. The conduit (4 in Figure 2) is of an internal diameter of 125 mm. and has four bends of right angle. The bulk density of the powder without packing is 1.1 g./cm.$^3$, its specific weight 3.8 g./cm.$^3$, and the average grain size 33 microns.

At a tower diameter of 200 mm., and an initial air excess pressure of 250 grams/cm.$^2$ above the pressure of the surrounding atmosphere, the fluidized alumina hydrate charge in the tower (21 in Figure 2) adopts a level of 2.6 meters. The amount of material transported within one hour is 2.4 metric tons. The initial transport excess pressure is 200 g./cm.$^2$, so that a partial excess pressure of 50 g./cm.$^2$ is required for fluidization. The consumption of air at a compression of 250 g./cm.$^2$ is 500 m.$^3$ per hour (reduced to 0° C. and 760 mm. Hg).

Example IV

A dried and ground sludge is to be elevated by 10 meters over a length of conveying pipe of 50 meters, free from bends. The internal diameter of the conveying pipe is 150 mm. The material has a bulk density of 0.9 g./cm.$^3$ without packing, and a specific weight of 1.3 to 1.9 g./cm.$^3$, and its average grain size is 0.3 mm. to 1 mm.

With an internal tower (21 in Figure 2) diameter of 250 mm., and an initial excess pressure of 300 grams/cm.$^2$ above atmospheric, of the compressed air, the fluidized material reaches a height of 3 meters in the column. The transport excess pressure available at the foot of the tower is 150 g./cm.$^2$.

The consumption of air is 800 m.$^3$/h. (reduced to 0° C. and 760 mm. Hg), for an hourly transportation of 4 tons (metric) of material.

While I have shown and described several embodiments of the method and system of my invention, it will be understood that many other modifications thereof and changes therein may be made within the spirit of my invention which shall therefore not be limited except in so far as is made necessary by the prior art and by the spirit of the appended claims.

What I claim is:

1. A system for fluidizing and pneumatically transporting pulverulent materials, comprising tower means having an upper and a lower end, said tower means being open at its upper end to freely communicate with the surrounding amosphere therethrough, and adapted to be filled with a column of pulverulent material having a variable top level therein, means for admitting fluidizing agent to said tower means in the region of said column of pulverulent material, so as to form a fluidized zone in at least part of said material in said column, pneumatic conduit means for removing fluidized material from said fluidized zone, said pneumatic conduit means being in free communication with said tower means and said column therein at a determined level of said fluidized zone substantially over the entire cross sectional area of said column, and pressure means in said pneumatic conduit means at said determined level, said pressure means being adapted for supplying a pressure medium capable of producing sufficient excess pressure to said fluidized zone so that part of said excess pressure-producing medium balances the weight of said column of pulverulent material, while the remaining excess pressure-producing medium continuously passes through the entire cross sectional area of said column at said determined level and conveys a portion of said fluidized material away from said column through said conduit means.

2. A system for fluidizing and pneumatically transporting pulverulent materials comprising tower means having an upper and a lower end, and adapted to be filled through said upper end with a column of pulverulent material of variable top level, said tower means being open at said upper end to freely communicate with the surrounding atmosphere therethrough, means for admitting fluidizing agent to said tower means in the bottom zone thereof, so as to form a fluidized zone in at least the lower portion of said column, pneumatic conduit means for removing fluidized material from said fluidized zone from substantially the bottom level of said column, said tower means opening freely communicatingly with its lower end into said pneumatic conduit means substantially over the entire cross sectional area of said column, and pressure means in said pneumatic conduit means at said bottom level, said pressure means being adapated for supplying a pressure medium capable of producing sufficient excess pressure to said fluidized zone so that part of said excess pressure-producing medium balances the weight of said column of pulverulent material, while the remaining excess pressure-producing medium continuously passes through the entire cross sectional area of said column at said bottom level and conveys a portion of said fluidized material away from said column through said conduit means.

3. A system for fluidizing and pneumatically transporting pulverulent materials comprising tower means having an upper and a lower end and adapted to be filled through said upper end with a column of pulverulent material of variable top level, said tower means being open at its upper end to freely communicate with the surrounding atmosphere therethrough, means for admitting fluidizing agent to said tower means in the bottom zone thereof, so as to form a fluidized zone in at least the lower portion of said column and pneumatic conduit means for removing fluidized material from said fluidized zone, said tower means opening freely communicatingly with its lower end into said pneumatic conduit means substantially over the entire cross sectional area of said column, ejector means in said pneumatic conduit adjacent said lower end of said tower means and adapted for blowing a compressed conveying agent into said pneumatic conduit means past said freely communicating lower end of said tower means with a sufficient pressure so that part of the latter balances the weight of said column of pulverulent material, while the remaining excess pressure continuously conveys a portion of said fluidized material through said conduit means.

4. A system for fluidizing and pneumatically transporting pulverulent materials comprising tower means having an upper and a lower end, and adapted to be filled with a column of pulverulent material through said upper end, said tower means being open at its upper end to freely communicate with the surrounding atmosphere therethrough, means for admitting a first part of a compressed fluidizing and conveying agent to said tower means in the bottom zone thereof, so as to form a fluidized zone in at least the lower portion of said column and pneumatic conduit means for removing fluidized material from said fluidized zone, said tower means opening freely communicatingly with its lower end into said pneumatic conduit means substantially over the entire cross sectional area of said column, ejector means in said pneumatic conduit adjacent said lower end of said tower means and adapted for blowing another part of said compressed conveying agent into said pneumatic conduit means past said freely communicating lower end of said tower means, with a sufficient pressure to balance, jointly with the first part of said agent, the weight of said column of pulverulent material in said tower means, and concurrently therewith conveying a portion of said fluidized material through said conduit means, and valve means for controlling the flow of fluidizing agent through said fluidizing means into said tower means.

References Cited in the file of this patent

UNITED STATES PATENTS

| | | |
|---|---|---|
| 1,473,757 | Dorsey | Nov. 13, 1923 |
| 1,616,547 | Pontoppidan | Feb. 8, 1927 |
| 2,125,913 | Goebels | Aug. 9, 1938 |
| 2,726,136 | Davis | Dec. 6, 1955 |
| 2,758,564 | Randall | Aug. 14, 1956 |